United States Patent [19]

Haentjens

[11] 4,224,008
[45] Sep. 23, 1980

[54] VOLUTE SLURRY PUMP AND THROTTLE BUSHING THEREFOR

[76] Inventor: Walter D. Haentjens, R.D. #1, Box 121, Sugarloaf, Pa. 18249

[21] Appl. No.: 939,448

[22] Filed: Sep. 5, 1978

[51] Int. Cl.³ .............................................. F01D 25/16
[52] U.S. Cl. .................................. 415/112; 415/170 R
[58] Field of Search .................. 415/111, 112, 170 R, 415/170 A; 308/240, 237 R, 238

[56] References Cited

U.S. PATENT DOCUMENTS

| | | | |
|---|---|---|---|
| 1,629,314 | 5/1927 | Schein | 308/73 |
| 1,685,751 | 9/1928 | Pfau | 308/72 |
| 1,956,973 | 5/1934 | Baum | 308/73 |
| 2,332,150 | 10/1943 | Huff | 415/112 |
| 2,448,717 | 9/1948 | Jeffcock | 415/112 |
| 3,452,839 | 7/1969 | Swearingen | 184/6 |
| 3,603,213 | 9/1971 | Tootle | 308/240 |
| 3,804,423 | 4/1974 | Booy | 415/170 R |
| 3,971,606 | 7/1976 | Nakano et al. | 308/238 |

FOREIGN PATENT DOCUMENTS 43-21328  6/1968  Japan ......................... 415/110

OTHER PUBLICATIONS

Barrett, Haentjens & Co., Bulletin Sheet 403, p. 15, Reprinted 11/72.

*Primary Examiner*—Everette A. Powell, Jr.
*Assistant Examiner*—A. N. Trausch, III
*Attorney, Agent, or Firm*—Hill, Van Santen, Steadman, Chiara & Simpson

[57] ABSTRACT

Throttle bushing for a large capacity volute slurry pump in which the impeller is on the end of a cantilever drive shaft a substantial distance from the bearing support for the shaft and the shaft is subject to droop by its weight and the weight of the impeller. The weight of the overhanging shaft and impeller in addition to irregular loads on the shaft gives the shaft an exponential shape. The throttle bushing is between the impeller and packing or seal and is machined to take the same shape the shaft will take under load regardless of the angular direction of the load and to clear the shaft in all conditions of droop thereof as well as gyrations which will occur from unequal loads on the impeller when the pump is starting up or operating at over-capacity.

11 Claims, 5 Drawing Figures

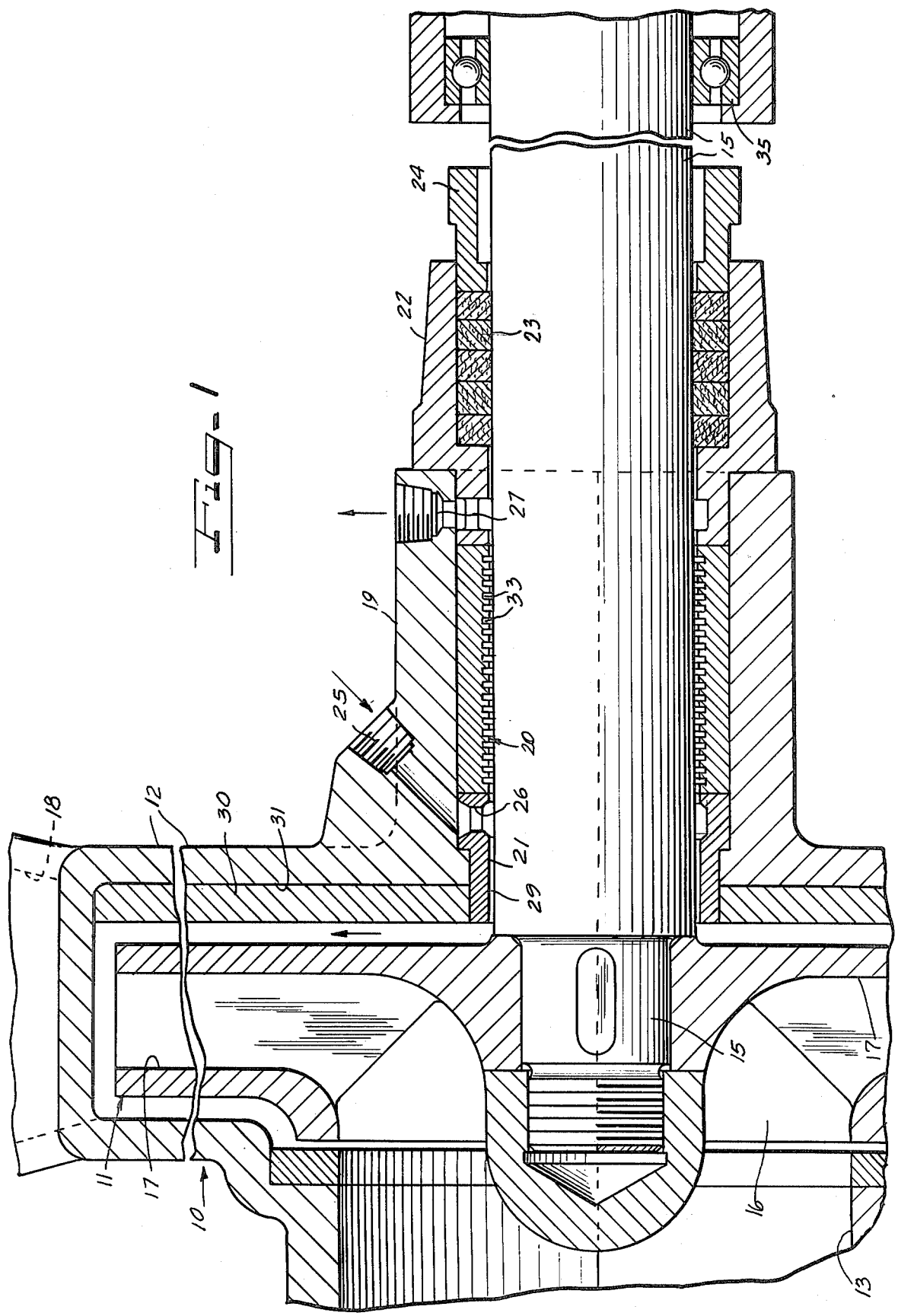

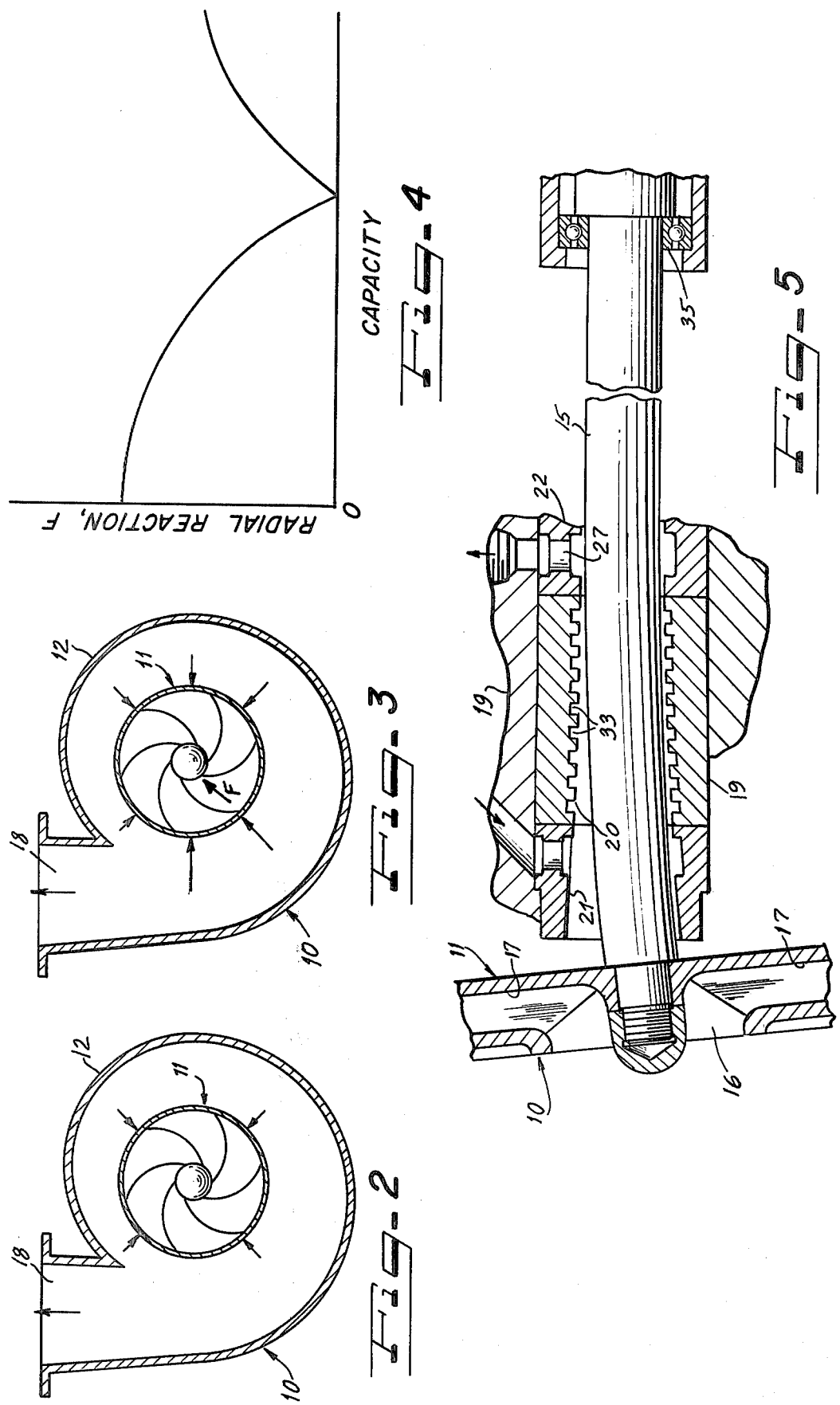

VOLUTE SLURRY PUMP AND THROTTLE BUSHING THEREFOR

BACKGROUND AND SUMMARY OF INVENTION

Heretofore, throttle bushings have been used in pumps of the volute type having a sturdy, straight shaft supported between spaced bearings. The present invention, however, is concerned with end-intake, single stage slurry pumps of the volute type and particularly high-horsepower pumps which may be connected in series and deliver slurry in the range of 600 psi and above in which the impeller of each pump has a large overhang beyond its bearings.

Where such pumps operate at high pressures, the packing gland or conventional seal on the outboard side of the bearing is always a problem, being a source of excessive maintenance and not satisfactory except for short periods of time.

While mechanical seals have been substituted for the packing gland or conventional seal, such seals are unreliable and require an undue amount of maintenance, which, due to the size of the pump, is a time-consuming job.

A throttle bushing, however, ahead of the packing gland or conventional seal, cuts down pressure as long as there is an appreciable flow through the bushing. Such bushings have been vented to atmosphere or to a controlled pressure and have been effective for multistage pumps having two bearings and a sturdy, straight shaft supported therebetween.

Where the impeller is relatively large and heavy and carried on the end of a large diameter impeller shaft and overhangs the impeller shaft, bearings and packing or seal a substantial amount, the shaft is given an exponential shape.

By the present invention, I utilize a relatively short packing gland, but extend the shaft from its bearing a greater distance than normal, as for example, 40 inches, and utilize a relatively long throttle bushing ahead of the packing gland. I also admit clear water under pressure through the neck of the pump casing and pass this clear water between the shaft and throttle bushing and discharge the clear water to atmosphere or a controlled pressure on the inboard side of the packing gland. A portion of the clear water is also passed into the pump to prevent the fluid pumped, which may be an abrasive slurry, from passing into the throttle bushing area. With such an arrangement, the pressure is reduced as the clear water flows through the throttle bushing to a controlled pressure, which may be low enough for conventional packing glands or mechanical seals to perform satisfactorily.

I further provide clearance between the shaft and throttle bushing and maintain this clearance in all positions the shaft will take, to accommodate the flow of clear water between the shaft and throttle bushing and to prevent seizure between the throttle bushing and shaft or scoring of the shaft by the bushing, which is usually made of a relatively hard metal. This clearance is difficult to maintain, particularly with a 1,000 pound impeller at the end of a shaft in the order of 6 inches in diameter in which the impeller is spaced in the order of 40 inches from the inboard bearing. With such an impeller and shaft, where the impeller is located in the order of 40 inches from the inboard bearing for the shaft, there will be a droop to the shaft at the impeller of substantially 0.011 inches. By uniformly increasing the clearance between the shaft and impeller, to accommodate this droop, the efficiency of the throttle bushing is decreased, even when the radial hydraulic thrust on the impeller is uniform.

It is, of course, understood that with pumps of the single volute type, the radial thrust is only uniform at the best operating efficiency of the pump and becomes non-uniform at reduced capacities, particularly when the pump is started or is stopping.

Instead of increasing the bore of the throttle bushing to accommodate the shaft droop as well as the gyrations which will occur from the impeller imbalance as the impeller wears, I match the bore of the throttle bushing to the shape the shaft will take under load, regardless of the angular direction of the load. This is done by calculating the deflection curve of the shaft for the worst operating conditions anticipated, and then machining the throttle bushing to the shape of the shaft deflection curve to assure minimum clearance and maximum effectiveness of the throttle bushing.

ADVANTAGES OF THE INVENTION

A particular advantage of the present invention is that I make practical the use of a packing gland or mechanical seal for a single stage volute pump, where the impeller overhangs the shaft bearings a substantial distance, by utilizing a throttle bushing between the packing gland and impeller and providing sufficient clearance between the shaft and bushing to prevent seizing between the shaft and bushing or scoring of the shaft, and provide a source of clear water under pressure in which a major portion flows back through the throttle bushing and is released at a controlled pressure ahead of a conventional packing gland or mechanical seal, and low enough for the packing gland or mechanical seal to perform satisfactorily.

A further advantage of the present invention is that I materially increase the life of a packing gland or mechanical seal of a single stage volute pump by preventing the damage heretofore caused by unequal forces on the impeller and high pressures on the packing gland, by utilizing a throttle bushing inboard of the packing gland and machining the bore of the bushing to the droop of the cantilever shaft caused by the overhanging weight of the shaft and impeller and the unbalanced forces acting on the impeller when the pump is operating at other than its most efficient operating conditions.

A still further advantage of the invention is that damage to the packing gland or mechanical seal of a volute single stage slurry pump having a heavy impeller supported on the end of a large diameter cantilever shaft is obviated, by utilizing a short packing gland or mechanical seal and a relatively long throttle bushing on the inboard side of the packing gland, and conform the throttle bushing to the maximum droop of the shaft caused by the overhanging weight of the shaft and impeller and to uneven radial loads on the impeller when the pump is operating at other than its maximum efficiency and admit fluid under pressure to the inboard end of the throttle bushing at a pressure greater than pump pressure and release fluid under pressure at a controlled pressure which can only be handled by a conventional packing gland or mechanical seal.

A further advantage of the present invention is that by machining a throttle bushing to match the shape a cantilever impeller shaft will take under load and reducing the pressure at the outboard end of the throttle bushing, I make it possible to use a conventional packing gland at the inboard end of the shaft bearings for a cantilever impeller shaft having a large overhang.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a fragmentary diagrammatic longitudinal sectional view taken through a single stage volute pump utilizing a throttle bushing constructed in accordance with the principles of the present invention;

FIG. 2 is a diagrammatic transverse sectional view taken through the impeller and its casing, and forming a force diagram showing the relation of the hydraulic forces on the impeller and its shaft when the impeller is balanced and operating under maximum efficiency conditions;

FIG. 3 is a diagrammatic transverse sectional view like FIG. 2 and illustrating the non-uniform forces on the impeller and its drive shaft when the pump is operating under low load or over-capacity conditions;

FIG. 4 is a force diagram illustrating the radial reaction on the impeller of a single stage volute pump and how this reaction decreases from shut-off to design capacity and increases upon over-capacity of the pump; and FIG. 5 is a diagrammatic longitudinal sectional view in exaggerated form to illustratively show the form a throttle bushing may take to allow for the deflection of a cantilever impeller shaft under extreme operating conditions, caused by a large overhang on the shaft from its bearing and low load on the impeller when starting or stopping the pump.

DESCRIPTION OF PREFERRED EMBODIMENT OF INVENTION

In the embodiment of the invention illustrated diagrammatically in FIG. 1 of the drawings, I have shown in longitudinal section a single volute pump 10 of a type which may be used with other single volute pumps in series to deliver a slurry, which may be coal and water slurry or any other type of slurry. Each pump in the series of pumps is driven from an individual motor (not shown), which for example may be an 800 to 2000 horsepower motor. The delivery rate of the pump may be in the order of 4000 to 10,000 gpm of slurry against a discharge pressure of 100 to 400 feet per stage and may be hydrostatically tested at pressures in excess of 600 psi. The above capacities and pressures are illustrative only and I do not desire to be limited to any particular capacity and pressure range or to any particular overhang of the impeller from the shaft bearings.

The pump includes an impeller 11 of a conventional form within a volute casing 12 having a central inlet 13 coaxial with the axis of said impeller. The impeller 11 may be keyed or otherwise secured to the overhanging end of a cantilever pump drive shaft 15.

The impeller 11 has an annular inlet 16 in communication with the inlet into the pump casing and radial passageways 17 leading radially of the impeller for impelling a fluid, which may be a slurry or any other type of fluid, out through an outlet 18 of the casing head 12.

The casing head 12 has a neck 19 extending along the shaft 15 for a portion of the length thereof and forming a mounting for a throttle bushing 20 and also forming a mounting for a neck ring 21 at the inboard end of said throttle bushing and a stuffing box housing 22 at the outboard end of said throttle bushing and extending beyond said housing to form a mounting for a sealing means or stuffing box 23. An outboard annular retainer or gland 24 is shown as being provided to retain the sealing means 23 to the shaft 15 and stuffing box housing 22. Fluid under a predetermined pressure, which must be a clean liquid, is admitted to the throttle bushing on the inboard side thereof through a passageway 25 communicating with a passageway 26 in the neck ring 21. The clear water is released to atmosphere or under a controlled pressure through an outlet passageway 27 in the housing 19. Clear water is also delivered from the passageway 25 in an annular space 29 between the neck ring 21 and shaft 15 to flow along a wear plate 30 disposed between the neck ring 21 and an inner side wall 31 of the pump casing 12 at a differential in pressure between the pressure of fluid entering the neck ring 21 as restricted by said neck ring in the annular space 29 and the discharge pressure of the pump to prevent the backflow of slurry along the shaft 15, which may abrade the shaft and throttle bushing.

As for example, for a pump operating against a discharge pressure of 950 psi, the flow of clear water through the inlet passageway 25 may be at a pressure slightly above the discharge pressure of the pump and may be in the order of 20 gpm at 1,000 psi. The controlled pressure at which fluid is released through the outlet passageway 27 to maintain the pressure on the sealing means at a pressure which can be handled by the conventional sealing means or stuffing box, may for example may be in the order of 100 to 300 psi. The throttle bushing 20 substantially reduces the pressure from that introduced at 25. Clear water may flow back into the pump along the back plate 30 at a delivery rate of 1 gpm and a pressure high enough to prevent the passage of slurry along the throttle bushing, with 19 gpm flowing through the outlet passageway 27.

As shown in the drawings, the throttle bushing 20 has a plurality of parallel spaced annular throttling channels 33 therein opening toward the shaft 15 and serving to throttle the clear water as it passes to the outlet 27.

With a pump like that diagrammatically shown, where the shaft is in the order of 6 inches in diameter and the impeller weighs on the order of 1,000 pounds and is 40 inches from an inboard beaing 35, the droop of the shaft may be 0.011 inch, 30 inches from the bearing. This is a region where the throttle bushing is located and in order that the throttle bushing be free from the shaft to avoid scoring or damage to the shaft, there must be sufficient clearance to take care of this droop of the shaft or the bushing must be placed off-center to align the clearance.

FIG. 2 diagrammatically shows the best operating efficiency for the pump, which is at full capacity and the radial reaction on the impeller shaft is substantially uniform. This is illustrated in the reaction capacity curve shown in FIG. 4. In FIG. 3, the radial reaction on the impeller varies and is non-uniform during start-off of the pump until the pump reaches full capacity and then becomes non-uniform as the pump is operating at over-capacity. The changes in force on the impeller are clearly shown in a reaction capacity curve illustrated in FIG. 4, and FIGS. 2, 3 and 4 clearly show why the impeller shaft may droop by uneven radial forces on the impeller in addition to the droop of the impeller shaft caused by its long overhang from its bearing and the overhanging weight of the shaft as well as the weight of the impeller, which droop may decrease as the pump reaches capacity due to the balanced radial forces on the impeller. The absolute value of the radial thrust on the impeller is, however, a function of the pump design parameters, which are known to the individual pump designer.

In order that the throttle bushing be free from the shaft 15 in all conditions of droop thereof, and also imbalance of the impeller as it wears and the unbalanced radial forces acting on the impeller when operating at less than the normal capacity of the pump, I machine the internal periphery of the throttle bushing to conform to the shaft, that is, take the same shape that the shaft will take under load, regardless of the angular direction of the forces, as shown in an exaggerated form in FIG. 4. While this results in a larger clearance near the impeller than if the throttle bushing were machined for a straight shaft with no droop, the throttling effect of the throttle bushing will progressively increase to a maximum degree as the distance from the impeller increases.

The internal periphery of the throttle bushing may be machined by calculating the combined radial load on the impeller for all forces and then drawing the shape of the resulting shaft deflection along its axis from the inboard bearing. The deflection of the shaft in alignment with the location of the throttle bushing may then be transferred to a template and used with the conventional tracer lathe to bore the throttle bushing to a mating shape.

The shape of the deflection curve which gives the maximum deflection at the end of the shaft can be approximately determined from the following basic formula:

$$\text{Deflection} = WL^3/3EI$$

where W is the overhung weight, assuming this weight to be significantly greater than the overhung shaft weight. L is the overhung length of the impeller from its bearing. E is the modulus of elasticity of the shaft material. I is the section modulus for a straight, round shaft which in the present case is d to the fourth power over 64. From the above, the deflection curve can be calculated for the worst operating conditions anticipated and the throttle bushing machined as previously described to the shape of the shaft deflection curve, to assure minimum clearance and maximum effectiveness of the throttle bushing. I further assure that the throttle bushing, neck ring 21 and stuffing box housing 22 be free from the shaft 15 in all conditions of deflection thereof, since the neck ring 21, stuffing box housing 22 and throttle bushing 20 are made of hard material and the heat of contact is likely to result in cracking or binding between the shaft and throttle bushing.

While I have herein shown and described the use of one throttle bushing, it should be understood that more than one throttle bushing may be used and that I do not wish to limit myself to a single throttle bushing. Where more than one throttle bushing is used, the throttle bushings may be separated by a neck ring and controlled pressure outlets may lead radially through each neck ring. The flows through the controlled pressure outlets would therefore have different back pressure values.

It, of course, is understood from the foregoing description that the casing 12 need not be described in detail since it is only shown diagrammatically. The pump casing, however, is diagrammatically shown by the section lines as being horizontally split to provide access to the impeller for installing and removing the impeller, although it need not be so split, and conventional access means to the impeller may be provided.

I claim as my invention:

1. In a single volute pump of a type used for pumping slurries and having a casing having a generally spiral interior wall, a central inlet into said casing, a cantilever shaft coaxial with said inlet, an impeller within said casing on the overhanging end of said shaft, bearing support means spaced a substantial distance from said impeller on the opposite side of said casing from said inlet, said shaft being deflectable by the weight of said shaft outwardly of said bearing support means to the impeller end thereof and the weight of said impeller on the end of said shaft and the unequal radial forces on said impeller under load conditions other than capacity load conditions, sealing means mounted within said casing inboard of said bearing support means, and means reducing the pressure on said sealing means comprising throttle bushing means having an inner wall machined to match the deflection of said shaft and to clear said shaft in all operating conditions of said pump and attaining an increasing throttling effect on said shaft as deflected as said throttle bushing means approaches said sealing means.

2. The throttle bushing means of claim 1 in which the throttle bushing means comprises at least one throttle bushing and means are provided for admitting clear water under pressure to said throttle bushing at the inboard end thereof, other means are provided for discharging clear water at a controlled reduced pressure at the outboard end of said throttle bushing to reduce the pressure to a pressure which will not damage said sealing means, and bypass means are provided for bypassing clear water under pressure to said pump to prevent the entry of slurry into said throttle bushing.

3. The throttle bushing of claim 1, wherein the bushing has a cylindrical outer wall fitting within said casing and an annular grooved inner wall having a series of spaced throttling grooves therein opening toward said shaft.

4. A single volute pump of a heavy-duty type adapted for use in series with other pumps for pumping slurries and the like, comprising:
a casing having a volute interior wall,
an inlet into said casing from one side thereof,
an outlet forming a continuation of said volute interior wall,
an impeller in said casing having an axis generally coaxial with the axis of said inlet,
a shaft extending along said casing and having said impeller mounted on the end thereof,
bearing support means for said shaft spaced a substantial distance from said impeller,
sealing means inboard of said bearing support means,
said shaft drooping by its weight projecting beyond said bearing support means and the weight of said impeller, and
means protecting said sealing means from the high pressure of said pump comprising throttle bushing means inboard of said sealing means and extending toward said impeller, said throttle bushing means being at least as hard as said shaft and being substantially longer than said sealing means and clearing said shaft in all positions of droop thereof caused by the overhanging weight of said shaft and impeller and uneven radial loads on said impeller when the pump is operating at other than capacity.

5. The volute pump of claim 4, wherein the throttle bushing has a plurality of parallel annular channels therein opening toward said shaft and is made from a hard material.

6. The single volute pump of claim 5, including a passageway into said casing at the inby end of said throttle bushing for admitting clear fluid under pressure thereto, a second passageway at the outboard end of said throttle bushing for releasing fluid under pressure at a controlled pressure that can be handled by said sealing means without damage thereto, and passageway means between said shaft and throttle bushing and extending to and along said impeller to prevent the backflow of slurry into said throttle bushing.

7. The single volute pump of claim 5, wherein the throttle bushing has an inner wall machined to match the droop of said shaft caused by the weight of said shaft and impeller overhanging said bearing support means and the unequal forces on said impeller when said pump is operating at capacities other than the capacity of the pump.

8. The single volute pump of claim 7, in which clear fluid is admitted into said casing at the inby end of said throttle bushing at pressures greater than the delivery pressure of said pump and is delivered from said casing at the outby end of said throttle bushing at a controlled pressure which can be handled by the conventional sealing means, and the back pressure along said impeller is the differential in pressure between the pressure at the inby end of said throttle bushing and the internal pressure of said pump.

9. The volute pump of claim 8, in which the pressure of clear fluid delivered into said casing at the inby end of said throttle bushing is in the order of 1,000 psi, the controlled delivery pressure at the outby end of said throttle bushing is in the order of 100 to 300 psi and the back pressure along said impeller is in the order of 50 psi above the internal pressure of the pump.

10. The volute pump of claim 8, in which clear water is delivered to the inby end of said throttle bushing in the order of 20 gpm and 1,000 psi and is released at a controlled pressure at the outby end of said throttle bushing in the order of 19 gpm and 100 to 300 psi and the throttle bushing reducing the pressure along said shaft toward said sealing means maintains a pressure which can be handled by the conventional sealing means.

11. The volute pump of claim 8, in which the backflow of clear fluid along the impeller is in the order of 1 to 15 gpm depending on pump size at 50 psi above the internal presure of the pump.

* * * * *